US011965640B2

(12) United States Patent
Mori et al.

(10) Patent No.: US 11,965,640 B2
(45) Date of Patent: Apr. 23, 2024

(54) SUPER-HIGH PRESSURE LAMP

(71) Applicant: Ushio Denki Kabushiki Kaisha, Tokyo (JP)

(72) Inventors: Kazuyuki Mori, Tokyo (JP); Takayuki Hiraishi, Tokyo (JP); Junya Asayama, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/460,064

(22) Filed: Sep. 1, 2023

(65) Prior Publication Data

US 2024/0085002 A1 Mar. 14, 2024

(30) Foreign Application Priority Data

Sep. 8, 2022 (JP) ................................ 2022-143078

(51) Int. Cl.
*F21V 19/00* (2006.01)
*F21Y 111/00* (2016.01)

(52) U.S. Cl.
CPC ....... *F21V 19/0075* (2013.01); *F21Y 2111/00* (2013.01)

(58) Field of Classification Search
CPC ................................................ F21V 19/00785
See application file for complete search history.

(56) References Cited

U.S. PATENT DOCUMENTS 4,625,149 A * 11/1986 Danno .................. H01J 61/073 313/623
5,404,078 A * 4/1995 Bunk .................... H01J 61/366 313/623

FOREIGN PATENT DOCUMENTS

WO 2007/120521 A2 10/2007

* cited by examiner

*Primary Examiner* — Joseph L Williams
(74) *Attorney, Agent, or Firm* — Studebaker & Brackett PC

(57) ABSTRACT

Providing a super-high pressure lamp having increased pressure resistance. The super-high pressure lamp includes: an arc tube; and a sealing portion in which a front end of an exhaust pipe capable of exhausting gas in the arc tube or supplying gas into the arc tube is sealed, wherein, in the sealing portion, a height of a first sealed space, which has a tapered shape that becomes narrower toward a front end of the sealing portion, is larger than twice an inner diameter of the first sealed space.

11 Claims, 6 Drawing Sheets

SUPER-HIGH PRESSURE LAMP

BACKGROUND OF THE INVENTION

Field of the Invention

The present invention relates to a super-high pressure lamp.

Description of the Related Art

A super-high pressure lamp in which a high pressure gas is sealed in an arc tube is known. In recent years, there is a laser sustained plasma (LSP) lamp used as an ultraviolet light source used in an inspection process of a semiconductor substrate, a liquid crystal substrate, a color filter, and the like as one of the super-high pressure lamps (see Patent Document 1). The LSP lamp emits an excitation laser from the outside of the arc tube toward the inside of the arc tube to turn a target inside the arc tube into plasma. A super-high pressure luminescent gas is sealed in the arc tube. High-brightness and broadband light radiated from the lamp is utilized simultaneously with the generation of plasma.

PRIOR ART DOCUMENT

Patent Document

Patent Document 1: WO 2007/120521 A2

SUMMARY OF THE INVENTION

Higher brightness and longer life of a super-high pressure lamp are required by the market. In order to meet the market requirement, it is necessary to further increase the pressure resistance strength of the super-high pressure lamp. Therefore, an object of the present invention is to provide a super-high pressure lamp having increased pressure resistance.

The present inventors have found that pressure resistance of a super-high pressure lamp is not uniform, and a portion having a particularly low pressure resistance exists in a sealing portion. Therefore, the shape of the sealing portion for improving the pressure resistance strength has been devised.

A super-high pressure lamp of the present invention includes:

an arc tube; and a sealing portion in which a front end of an exhaust pipe capable of exhausting gas in the arc tube or supplying gas into the arc tube is sealed, in which, in the sealing portion, a height h1 of a first sealed space, which has a tapered shape that becomes narrower toward a front end of the sealing portion, is larger than twice an inner diameter d1 of the first sealed space.

The "super-high pressure lamp" refers to a lamp in which a pressure of 8 MPa or more (pressure during lighting) is applied to the inside of the arc tube. That is, pressure resistance of the "super-high pressure lamp" is 8 MPa or more. Hereinafter, the "super-high pressure lamp" may be simply referred to as a "lamp".

The "sealing portion" is a trace of the exhaust pipe attached to the lamp at the time of manufacturing the lamp. A method of forming the sealing portion will be described later.

A front end of the first sealed space may have an unbranched shape. In a case where the front end of the first sealed space has an unbranched shape, pressure resistance of the lamp is improved.

The super-high pressure lamp may further include a first branch and a second branch formed by branching the front end of the first sealed space, in which an interval between a front end of the first branch and a front end of the second branch may be 1.5 mm or less. In a case where the interval between the front end of the first branch and the front end of the second branch is 1.5 mm or less, the pressure resistance of the lamp is improved.

The interval between the front end of the first branch and the front end of the second branch may be shorter than an interval between a root of the first branch and a root of the second branch. Since the interval between the front end of the first branch and the front end of the second branch is narrowed, the pressure resistance of the lamp is improved.

The first branch and the second branch may be twisted in a pair. If the first branch and the second branch are twisted in a pair, the interval between the front end of the first branch and the front end of the second branch is narrowed and the pressure resistance of the lamp is improved.

An outer diameter d2 of the sealing portion may be three times or more the inner diameter d1 of the first sealed space. The thickness of the sealing portion increases, and the pressure resistance of the lamp is improved.

The super-high pressure lamp may further include two side tubes connected to the arc tube and disposed opposite to each other with the arc tube interposed between the two side tubes, in which the sealing portion may be provided on a curved surface or inside of any one of the two side tubes.

The super-high pressure lamp may further include two side tubes connected to the arc tube and disposed opposite to each other with the arc tube interposed between the two side tubes, in which an electrode may be disposed inside each of the two side tubes, and the sealing portion may be provided on the arc tube or a curved surface of any one of the two side tubes.

The super-high pressure lamp may be a laser sustained plasma lamp.

As a result, it is possible to provide the super-high pressure lamp having increased pressure resistance.

DETAILED DESCRIPTION OF THE PREFERRED EMBODIMENTS

Embodiments of the present invention will be described with reference to the drawings. It should be noted that the drawings disclosed herein merely show schematic illustrations except for graphs. The dimensional ratios on the drawings do not necessarily reflect the actual dimensional ratios, and the dimensional ratios are not necessarily the same between the drawings.

Some of the drawings are illustrated in an XYZ orthogonal coordinate system. The vertical direction is defined as a Z direction, and two directions orthogonal to each other in a horizontal plane orthogonal to the vertical direction are defined as an X direction and a Y direction. Positive and negative orientations distinguished from each other for directional expression will be described as a "+Z direction" and a "−Z direction" by adding positive and negative signs, while a direction expressed without distinction between positive and negative orientations will be described simply as the "Z direction". The −Z direction is a gravity direction.

First Embodiment

[Outline of Super-High Pressure Lamp]

Figure 1:
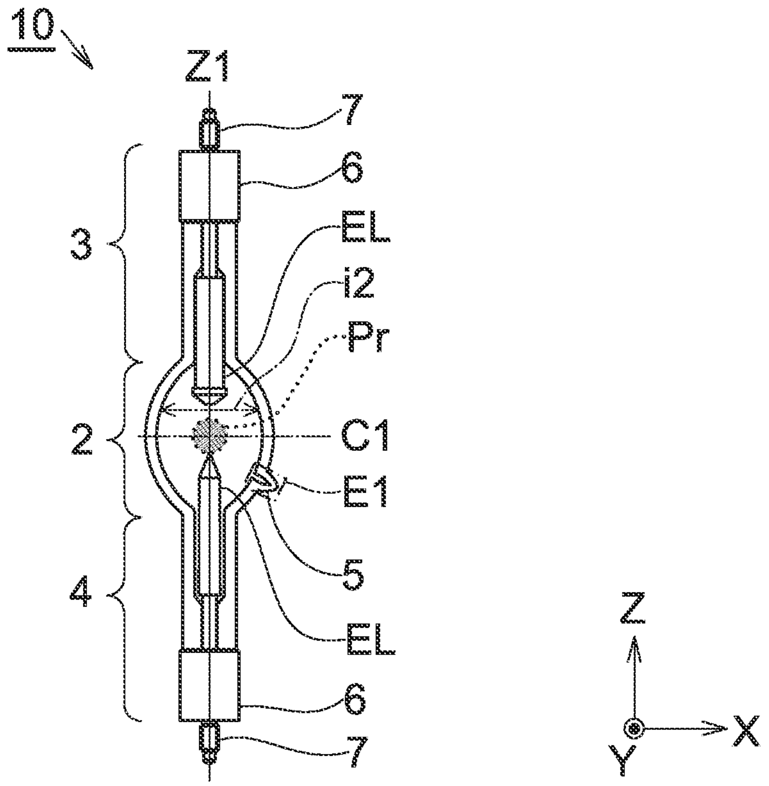
FIG. 1 is an overall view of a super-high pressure lamp of a first embodiment.

An outline of a super-high pressure lamp of a first embodiment will be described with reference to FIG. 1. FIG. 1 illustrates an LSP lamp 10 (hereinafter may be simply referred to as a "lamp 10"), which is a type of the super-high pressure lamp. The lamp 10 includes an arc tube 2, a first side tube 3 connected to one end of the arc tube 2, a second side tube 4 connected to the other end of the arc tube 2, a sealing portion 5, and two starting electrodes EL.

The arc tube 2, the first side tube 3, and the second side tube 4 are arranged along the Z1 axis. The Z1 axis is an axis parallel to the Z direction. Except for the sealing portion 5, the arc tube 2, the first side tube 3, and the second side tube 4 have a shape of a rotating body centered on the common Z1 axis. However, the arc tube 2, the first side tube 3, and the second side tube 4 may not have the common Z1 axis, or may not have a shape of a rotating body. The lamp 10 of the embodiment has a socket 6 on each of the first side tube 3 and the second side tube 4. In the lamp 10, a fixture 7 for fixing the lamp 10 to a light source device is provided at a front end of each socket 6.

In the present embodiment, the arc tube 2, the first side tube 3, and the second side tube 4 are made of glass material (for example, quartz glass). In the present embodiment, the arc tube 2 and the first side tube 3 have a hollow shape. The second side tube 4 has a solid shape. However, the second side tube 4 may have a hollow shape, or the first side tube 3 may have a solid shape. For example, the thicknesses of the arc tube 2 and the hollow side tube (3, 4) are preferably 2.5 mm or more and are preferably 4 mm or less. The variation in thickness of the arc tube 2 and the side tubes (3, 4) is preferably 15% or less, and is more preferably 10% or less.

The arc tube 2 is formed to bulge from the Z1 axis to the periphery of the Z1 axis including the X direction and the Y direction. The arc tube 2 has a space therein. An inner diameter i2 in the space of the arc tube 2 increases from the upper end and the lower end of the arc tube 2 in the Z direction toward a center plane C1 located at the center of the arc tube 2.

In the lamp 10 of the present embodiment, a working gas is sealed in the space inside the arc tube 2. The working gas comes to a high pressure, in particular during lighting. The lamp 10 has strength to withstand the pressure from the working gas of 8 MPa or more during lighting. The pressure resistance of the lamp 10 is preferably 15 MPa or more, and more preferably 25 MPa or more. Examples of the working gas include a rare gas such as argon, krypton, or xenon, or a mixed gas thereof.

In the arc tube 2, laser sustained plasma Pr is generated and light is emitted. Specifically, in the lamp 10, when an excitation laser is emitted toward the intersection of the Z1 axis and the center plane C1 of the arc tube 2 and the working gas sealed in the lamp 10 is turned into plasma to form plasma Pr, light containing desired light is emitted from the plasma Pr. When lighting is started, preliminary discharge is performed using the two starting electrodes EL to assist generation of plasma by the laser.

[Outline of Light Source Device]

Figure 2:
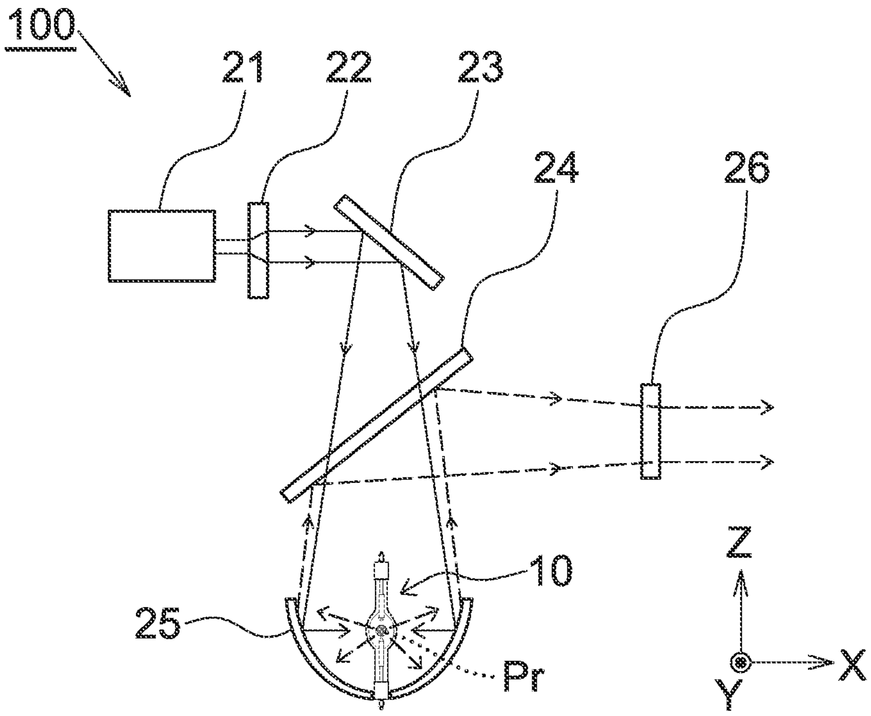
FIG. 2 is a view illustrating an example of a light source device incorporating the super-high pressure lamp.

FIG. 2 is a view illustrating an example of the light source device incorporating the lamp 10. A light source device 100 includes the lamp 10, a laser oscillation unit 21 that oscillates a laser (for example, a laser having a wavelength band of infrared light) to be applied to the lamp 10, and a condensing optical system 25 that condenses laser light from the laser oscillation unit 21. The laser light emitted from the laser oscillation unit 21 is shaped by a beam shaping optical system 22 including a collimator, a beam expander, and the like, is reflected by a reflecting mirror 23, passes through a wavelength selection type optical element 24 such as a dichroic mirror, is reflected by the condensing optical system 25, is condensed in a predetermined region, and enters the lamp 10. As a result, the excitation laser is applied to the lamp 10. In FIG. 2, the excitation laser is indicated by solid lines.

Light radiated from the lamp 10 is reflected by the condensing optical system 25, reflected by the optical element 24, passes through a beam shaping optical system 26 such as a homogenizer and a filter for making the light uniform, and travels toward a device (for example, a substrate inspection device) using laser light, not illustrated. In FIG. 2, the light generated by the lamp 10 is indicated by broken lines.

[Sealing Portion]

Figure 3A:
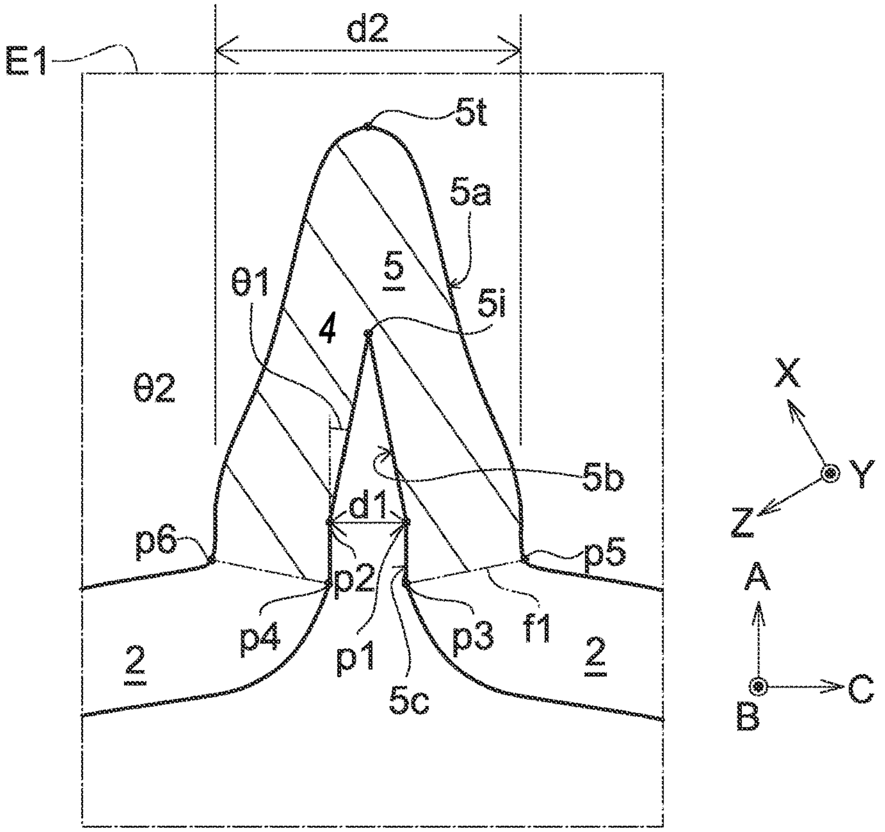
FIG. 3A is an enlarged view of an E1 region in FIG. 1.
Figure 3B:
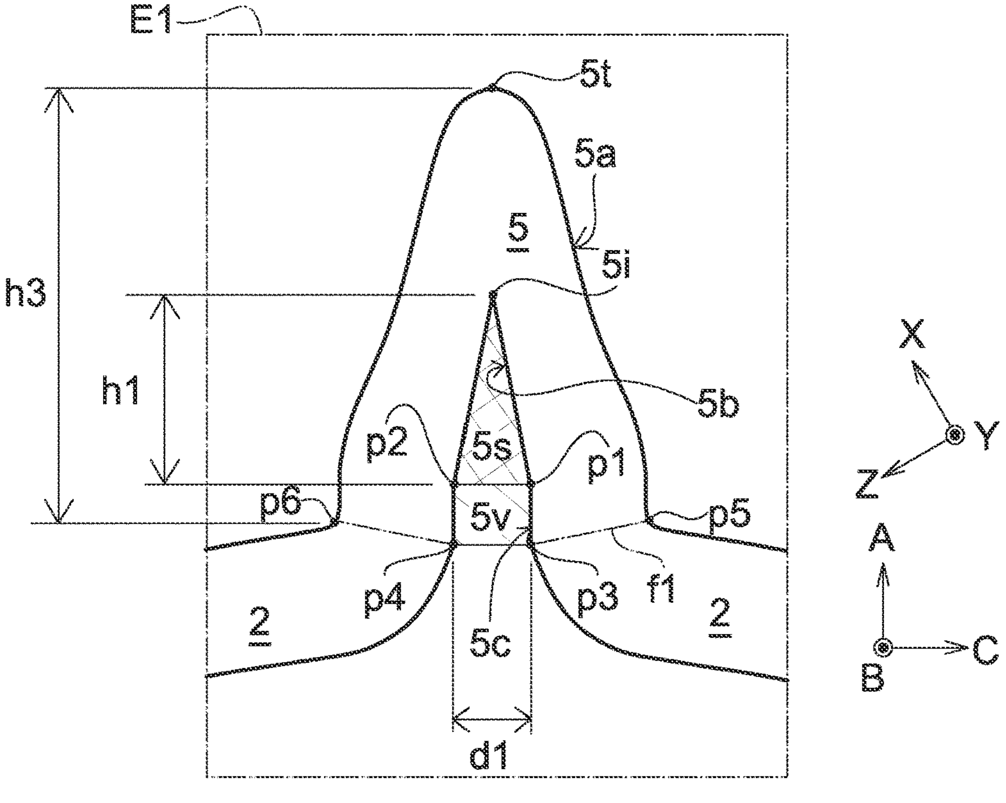
FIG. 3B is an enlarged view of the E1 region in FIG. 1.

The sealing portion 5 will be described. In the present embodiment, the sealing portion 5 is disposed on the arc tube 2. FIGS. 3A and 3B are enlarged views of an E1 region in FIG. 1. Details of the sealing portion 5 will be described with reference to FIGS. 3A and 3B. FIGS. 3A and 3B are views of the same sealing portion 5 viewed from the same direction, but FIGS. 3A and 3B are illustrated separately in order to make reference signs, auxiliary lines, and the like easily viewable. FIGS. 3A and 3B are both illustrated in the ABC orthogonal coordinate system in which the protruding direction of the sealing portion 5 is an A direction, and the directions orthogonal to the protruding direction are a B direction and a C direction. Note that FIGS. 3A and 3B have changed orientation from the XYZ orthogonal coordinate system of FIG. 1.

The sealing portion 5 includes an outer surface 5*a* and an inner surface (5*b*, 5*c*). Points p3 and p4 are portions having a large curvature on a second inner surface 5*c* to be described later. Points p5 and p6 are portions having a large curvature on the outer surface 5*a*. In the present specification, the boundary between the arc tube 2 and the sealing portion 5 includes the point p3, the point p4, the point p5, and the point p6. The boundary line between the arc tube 2 and the sealing portion 5 is defined as line segment p3-p5 and line segment p4-p6. A region (hatched region in FIG. 3A) on the +A side with respect to the line segment p3-p5 and the line segment p4-p6, which are the boundary line is defined as the sealing portion 5.

In FIG. 3A, the outer surface 5*a* of the sealing portion 5 extends from the point p5 to the point p6 via an outer apex 5*t*. The outer apex 5*t* is a point located at the most front end (maximum in the A direction) of the outer surface 5*a*. The outer surface 5*a* has a shape in which the outer diameter d2 generally decreases toward the front end of the sealing portion 5. The outer surface 5*a* may partially have a shape in which the outer diameter d2 does not decrease toward the front end of the sealing portion 5. The outer surface 5*a* is preferably a substantially conical surface as a whole.

In FIG. 3A, the inner surface (5*b*, 5*c*) of the sealing portion 5 includes a first inner surface 5*b* on the front end side and the second inner surface 5*c* on the rear end side. The first inner surface 5*b* extends from the point p1 to the point p2 via an inner apex 5*i*. The inner apex 5*i* is a point located at the most front end (maximum in the A direction) of the first inner surface 5*b*. The first inner surface 5*b* has a tapered shape in which the inner diameter of the sealing portion 5 decreases toward the front end.

As illustrated in FIG. 3B, a space (cross-hatched region in FIG. 3B) which is located on the front end side with respect to line segment p1-p2 connecting the point p1 and the point p2 and is surrounded by the first inner surface 5*b* is referred to as a first sealed space 5*s*. The width of the first sealed space 5*s* in the A direction is referred to as a height h1 of the first sealed space 5*s*. An inner diameter d1 of the first sealed space 5*s* is the interval between the point p1 and the point p2.

The present inventors have found, through intensive research, that a portion having low pressure resistance strength in the sealing portion 5 is near the front end of the first sealed space 5*s* where stress concentrates. The present inventors have found that if the taper angle θ1 (see FIG. 3A) of the first sealed space 5*s* is decreased, the pressure resistance strength is improved. Improvement of the pressure resistance strength of the sealing portion 5 leads to improvement of the pressure resistance strength of the entire lamp 10.

In order to realize the taper angle θ1 for enhancing the desired pressure resistance strength, the height h1 of the first sealed space 5*s* is preferably larger than twice the inner diameter d1 of the first sealed space 5*s*. The taper angle θ1 is preferably 15 degrees or less. The inner diameter d1 is preferably 1 mm or more and is preferably 3 mm or less. The height h1 is preferably 3 mm or more and is preferably 9 mm or less.

A height h3 of the sealing portion 5 is represented by the interval between the outer apex 5*t* and the point p5 (point p6) in the A direction. The height h3 is preferably twice or more the interval between the point p5 and the point p6.

Line segment p1-p3 and line segment p2-p4 corresponding to the inner surface of the sealing portion 5 extend substantially in a direction along the direction A. A region (hatched region in FIG. 3B) sandwiched between line segment p1-p3 and line segment p2-p4 is referred to as a second sealed space 5*v*. The inner diameter of the second sealed space 5*v* is substantially constant in the A direction and is the inner diameter d1.

The outer diameter d2 of the sealing portion 5 is represented by the interval between the point p5 and the point p6 in the C direction. The inner diameter of the sealing portion 5 is represented by the interval between the point p1 and the point p2 or the interval between the point p3 and the point p4 in the C direction. In the present embodiment, the outer diameter d2 is three times or more the inner diameter d1. As a result, the thickness of the sealing portion 5 can be sufficiently secured, so that the pressure resistance is improved. The outer diameter d2 is preferably 3 mm or more and is preferably 10 mm or less. The outer diameter d2 is more preferably 4 mm or more and is more preferably 9 mm or less.

Figure 4A:
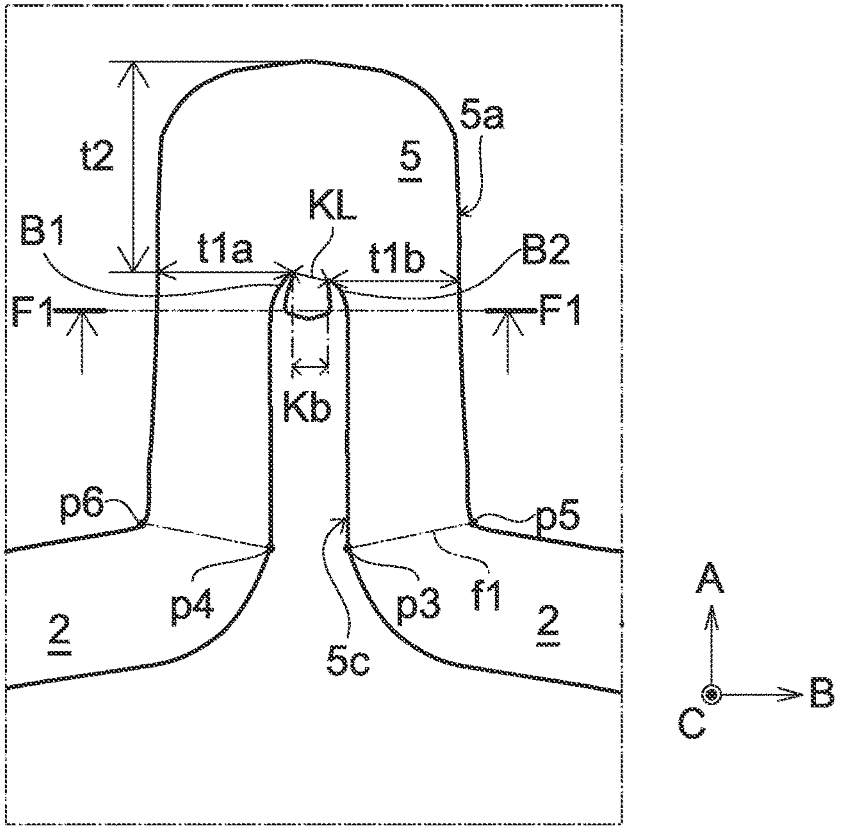
FIG. 4A is a view obtained by rotating the view illustrated in FIG. 3A (or FIG. 3B) by 90 degrees.

FIG. 4A is a view obtained by rotating the view illustrated in FIG. 3B by 90 degrees about an axis parallel to the A axis. The sealing portion 5 is preferably a rotationally symmetric figure, but the sealing portion 5 may not be a rotationally symmetric figure. In the sealing portion 5 of the lamp 10 of the present embodiment, the front end of the first sealed space 5*s* is branched into a first branch B1 and a second branch B2.

The front ends of the first branch B1 and the second branch B2 are portions having low pressure resistance strength, and cracks are likely to occur from the first branch B1 or the second branch B2 toward the outer surface 5*a*. The present inventors have considered that an interval KL between the front end of the first branch B1 and the front end of the second branch B2 affects the pressure resistance strength, and conducted the following experiment.

In order to examine the relationship between the interval KL between the front end of the first branch B1 and the front end of the second branch B2 and the pressure resistance strength, the lamps 10 ware prepared in which only the intervals KL were different and the other conditions were the same. Alcohol was gradually injected into each lamp 10, and the internal pressure of each lamp 10 was measured while increasing the internal pressure of each lamp 10. A pressure value when each lamp 10 is broken is defined as a fracture pressure BP.

Figure 5:
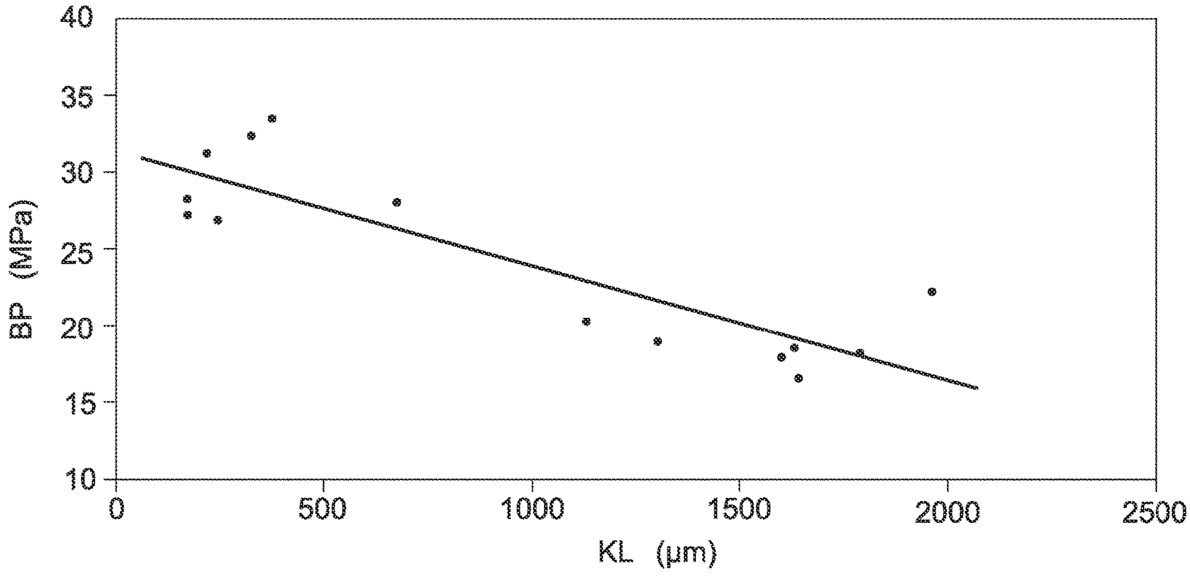
FIG. 5 is a graph illustrating the relationship between an interval KL between a front end of a first branch B1 and a front end of a second branch B2 and a fracture pressure BP.

FIG. 5 is a graph illustrating the relationship between the interval KL between the front end of the first branch B1 and the front end of the second branch B2 and a fracture pressure BP. Each point illustrated in FIG. 5 indicates the measurement results of the interval KL and the fracture pressure BP of each lamp 10. As indicated by the regression line of FIG. 5, it has been found that the fracture pressure BP tends to increase as the interval KL decreases.

As the interval KL decreases, a thickness t1*a* between the first branch B1 and the outer surface 5*a* and a thickness t1*b* between the second branch B2 and the outer surface 5*a* can be increased (see FIG. 4A). As a result, it is considered that the pressure resistance strength of the lamp 10 is improved. The interval KL between the front end of the first branch B1 and the front end of the second branch B2 is preferably 1.5 mm or less, and more preferably 1 mm or less. The interval KL between the front end of the first branch B1 and the front end of the second branch B2 is preferably designed to be shorter than the interval between the root of the first branch B1 and the root of the second branch B2.

The smaller the interval between the front end of the first branch B1 and the front end of the second branch B2 is, the thicker the thickness t1*a*/t1*b* can be, which is preferable. In a case where there is no branch at the front end of the first sealed space 5*s*, the thickness t1*a*/t1*b* can be maximized, which is more preferable.

Note that it is determined that there is no branch at the front end of the first sealed space 5*s* in a case where no branch is observed at the front end of the first sealed space 5*s* at any rotation angle when the sealing portion 5 is rotated by 360 degrees about the axis passing through the outer apex 5*t*.

Figure 4B:
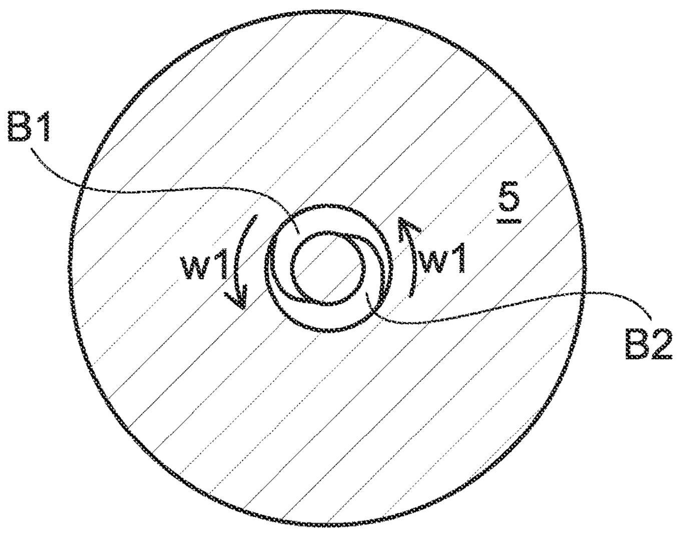
FIG. 4B is a cross-sectional view taken along line segment F1-F1 in FIG. 4A.

Details of a method of reducing the interval KL between the front end of the first branch B1 and the front end of the second branch B2 will be described later, but one of the methods is a method of twisting the branches. FIG. 4B is a cross-sectional view of line segment F1-F1 in FIG. 4A. FIG. 4B illustrates the first branch B1 and the second branch B2 sandwiched between a central region of the sealing portion 5 and a peripheral region of the sealing portion 5. It is observed that the front end of the first branch B1 and the front end of the second branch B2 both extend while bending in the w1 direction and are twisted in a pair. Due to the shape in which the front end of the first branch B1 and the front end of the second branch B2 are twisted in a pair, the interval KL between the front end of the first branch B1 and the front end of the second branch B2 can be made close to each other.

The interval between the front end of the first branch B1 and the front end of the second branch B2 in the B direction may be reduced, or the length (route) from the front end of the first branch B1 to the front end of the second branch B2 along the boundary of the first sealed space 5*s* may be reduced.

As described above, examples of the parameters related to the sealing portion 5 include the height h3, the outer diameter d2, and the thickness (t1*a*, t1*b*) of the sealing portion 5, the height h1, the inner diameter d1, the interval KL, and the taper angle θ1 of the first sealed space 5*s*. There is a possibility that all the parameters relating to the sealing portion 5 change when the sealing portion 5 is rotated about a straight line passing through the outer apex 5*t* of the sealing portion 5 and parallel to the A axis. In the present specification, the parameters related to the sealing portion 5 indicate maximum values in a case where the parameters are measured by rotating the sealing portion 5 about the straight line passing through the outer apex 5*t* of the sealing portion 5 and parallel to the A axis.

[Method of Forming Sealing Portion]

The method of forming the sealing portion 5 will be described. When the lamp 10 is manufactured, an exhaust pipe 8 is attached to the arc tube 2. The exhaust pipe 8 is used to exhaust gas in the space inside the arc tube 2 and supply a working gas to the space. After the working gas is supplied into the space, the exhaust pipe 8 is disconnected from the arc tube 2. At this time, part of the exhaust pipe 8 remains on the arc tube 2. The remaining exhaust pipe 8 becomes the sealing portion 5 which seals the inside of the arc tube 2 from the outside.

Figure 6:
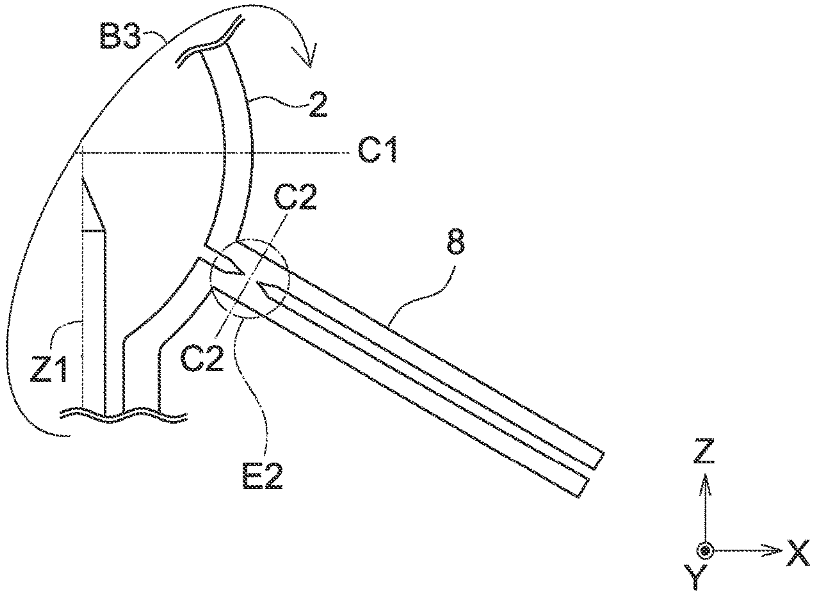
FIG. 6 is a view for explaining a method of disconnecting an exhaust pipe from an arc tube.

A method of disconnecting the exhaust pipe 8 from the arc tube 2 will be described with reference to FIG. 6. An E2 region of the exhaust pipe 8 close to the arc tube 2 is heated, and the exhaust pipe 8 is contracted to close the hole of the exhaust pipe 8. FIG. 6 illustrates a state after the hole of the exhaust pipe 8 is closed. Then, in order to cut the exhaust pipe 8 in the vicinity of line segment C2-C2, the arc tube 2 is gradually separated from the exhaust pipe 8 in a state where the vicinity of line segment C2-C2 is heated. The exhaust pipe 8 may be separated from the arc tube 2.

The shape of the sealing portion 5 (the taper angle of the first sealed space 5*s* or the like) can be changed by adjusting the heating temperature, the heating range, the separating speed, the separating direction, and the like. When the exhaust pipe 8 is separated, for example, if the arc tube 2 is separated from the exhaust pipe 8 while being rotated in the B3 direction in a state where the exhaust pipe 8 is fixed, the branches (B1, B2) at the front end of the first sealed space 5*s* can be formed in a twisted shape. Of course, the arc tube 2 may be fixed, and the exhaust pipe 8 may be separated from the arc tube 2 while being rotated in the B3 direction.

Second Embodiment

Figure 7:
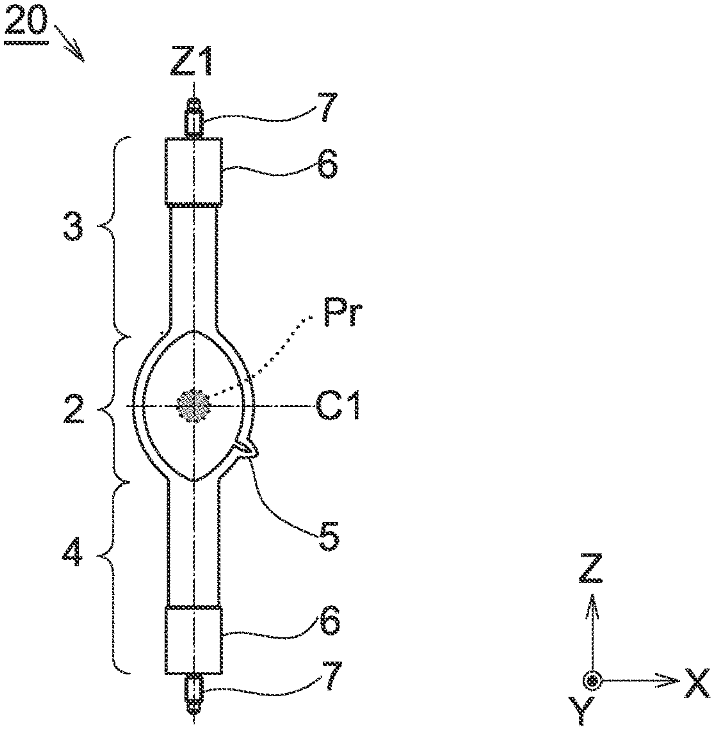
FIG. 7 is an overall view of a super-high pressure lamp of a second embodiment.

A super-high pressure lamp of a second embodiment will be described with reference to FIG. 7. The matters to be described below will be described focusing on portions different from those of the first embodiment. Description of matters similar to those in the first embodiment will be omitted. The same applies, too, from the third embodiment onward.

A lamp 20 is an LSP lamp not including two starting electrodes EL. A sealing portion 5 is provided on an arc tube 2 as in the first embodiment.

Third Embodiment

Figure 8A:
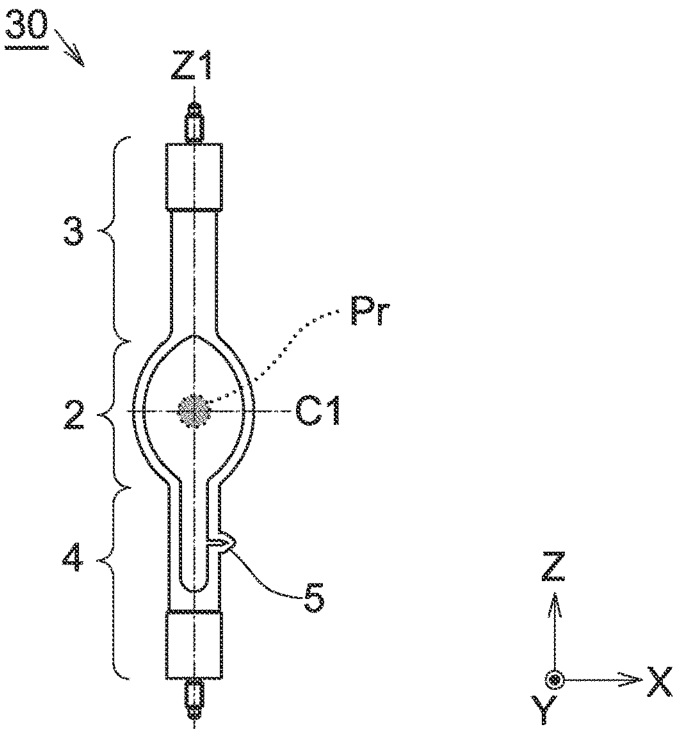
FIG. 8A is an overall view of a super-high pressure lamp of a third embodiment.
Figure 8B:
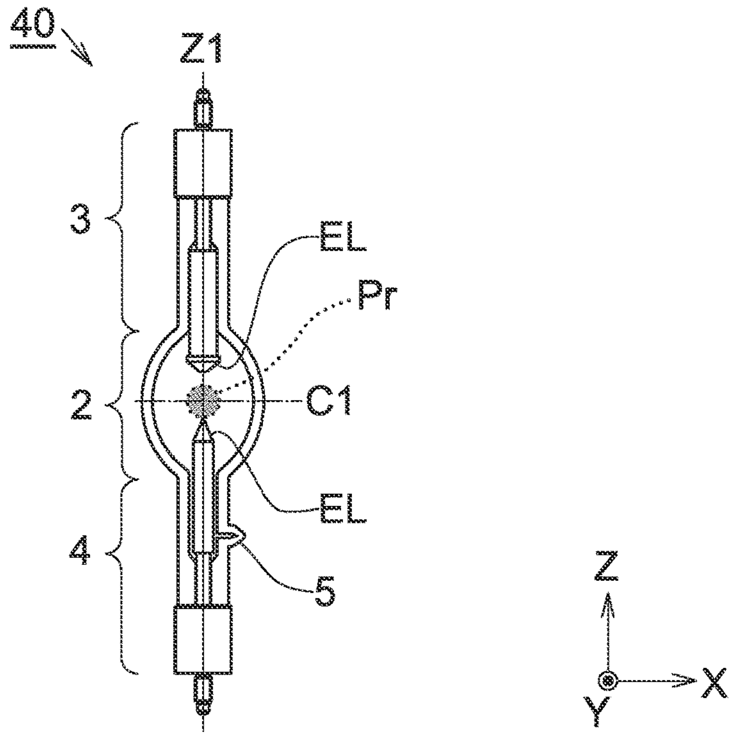
FIG. 8B is an overall view of a super-high pressure lamp of a modification of the third embodiment.

A super-high pressure lamp of a third embodiment will be described with reference to FIGS. 8A and 8B. In a lamp 30 illustrated in FIG. 8A, a sealing portion 5 is provided on a curved surface of a second side tube 4. An arc tube 2 is not provided with the sealing portion 5. The same applies to a lamp 40 illustrated in a modification of FIG. 8B. The lamp 30 illustrated in FIG. 8A does not include two starting electrodes EL, whereas the lamp 40 illustrated in FIG. 8B includes two starting electrodes EL.

Fourth Embodiment

Figure 9:
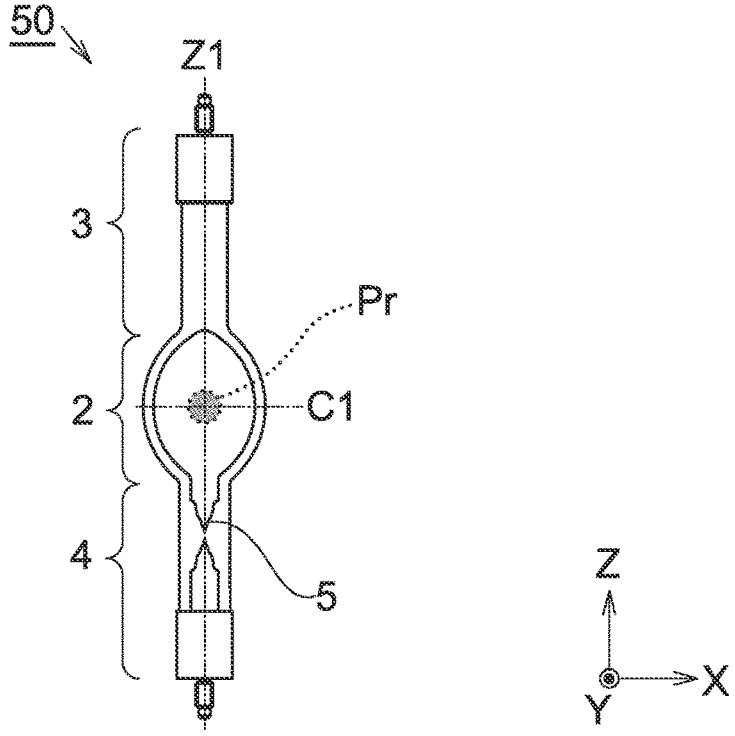
FIG. 9 is an overall view of a super-high pressure lamp of a fourth embodiment.

A super-high pressure lamp of a fourth embodiment will be described with reference to FIG. 9. In a lamp 50, a sealing portion 5 is provided inside a second side tube 4.

The embodiments of the super-high pressure lamp and the modification thereof have been described above. The present invention is not limited to the embodiments and the modification thereof described above, and various changes or improvements may be made to the embodiments and the modification thereof and two or more of the embodiments and the modification thereof may be combined without departing from the spirit of the present invention.

In the embodiments and the modification thereof described above, the LSP lamp has been indicated as an example of the "super-high pressure lamp". However, a super-high pressure mercury lamp used as a light source of an exposure device, used for curing or drying a resin adhesive, or used as a light source of a projector or the like is also a kind of the super-high pressure lamp. The above embodiments can also be applied to a super-high pressure mercury lamp.

EXAMPLES

A pressure resistance test was performed by using the lamps 10 of the first embodiment. Samples S1 to S15 are the lamps 10 different from one another in the inner diameter d1 of the first sealed space 5*s*, the height h1 of the first sealed space 5*s*, and the interval KL between the front end of the first branch B1 and the front end of the second branch B2. Type 1 has a non-twisted sealing portion obtained by pulling out the exhaust pipe 8 without rotating the arc tube 2. Type 2 has a twisted sealing portion obtained by pulling out the exhaust pipe 8 while rotating the arc tube 2. Type 3 has a sealing portion in which d1 and h1 are fixed and the front end of the first sealed space 5*s* is not branched.

The pressure resistance test of each sample was performed as follows. Alcohol was gradually injected into the lamp 10 of each sample, and the internal pressure of the lamp 10 was measured while increasing the internal pressure of the lamp 10. The pressure value when the lamp 10 is broken is defined as "fracture pressure".

As a result of the pressure resistance test, in any sample, the starting point of fracture was the sealing portion 5. A case where the fracture pressure is 25 MPa or more is evaluated as grade A, a case where the fracture pressure is 15 MPa or more is evaluated as grade B, and a case where the fracture pressure is less than 15 MPa is evaluated as grade C. Since the lamp 10 is superior as the fracture pressure increases, grade A, grade B, and grade C are ranked in this order of excellence. Note that the actual pressure resistance of the lamp 10 is a value obtained by considering the safety factor in the fracture pressure.

TABLE 1

| Type | Sample No. | d1 (μm) | h1 (μm) | h1/d1 | KL (μm) | Fracture pressure (MPa) | Pressure resistance evaluation |
|---|---|---|---|---|---|---|---|
| 1 | S1 | 2448 | 5748 | 2.35 | 1646 | 16.65 | B |
| | S2 | 2991 | 8717 | 2.91 | 1307 | 18.94 | B |
| | S3 | 3150 | 6595 | 2.09 | 1635 | 18.60 | B |
| | S4 | 2850 | 9261 | 3.25 | 1134 | 20.29 | B |
| | S5 | 2998 | 9509 | 3.17 | 1791 | 18.20 | B |
| | S6 | 2922 | 8809 | 3.01 | 1604 | 18.01 | B |
| 2 | S7 | 3056 | 8322 | 2.72 | 173 | 27.24 | A |
| | S8 | 3113 | 8859 | 2.85 | 375 | 33.44 | A |
| | S9 | 2499 | 6994 | 2.80 | 174 | 28.26 | A |
| | S10 | 2375 | 6144 | 2.59 | 245 | 26.93 | A |
| | S11 | 3230 | 8411 | 2.60 | 219 | 31.25 | A |
| | S12 | 2813 | 8113 | 2.88 | 325 | 32.29 | A |
| 3 | S13 | 3440 | 6335 | 1.85 | — | 9.69 | C |
| | S14 | 3432 | 6442 | 1.87 | — | 9.94 | C |
| | S15 | 3345 | 6595 | 1.97 | — | 12.10 | C |

The evaluation results are analyzed. h1/d1 of type 2, which is grade A or type 1, which is grade B is greater than 2. In contrast, h1/d1 of type 3, which is grade C is smaller than 2. That is, it has been confirmed that the height h1 of the sealed space where the inner diameter of the sealing portion changes is preferably larger than twice the inner diameter d1 of the sealing portion.

If type 2, which is grade A and type 1, which is grade B are compared, no significant difference of h1/d1 is observed between type 2 and type 1. However, the interval KL of type 2, which is grade A, is much smaller than the interval KL of type 1, which is grade B. As a result, it was confirmed that the interval KL is preferably smaller. The interval KL is preferably smaller than 1000 μm, and more preferably smaller than 500 μm.

What is claimed is:

1. A super-high pressure lamp comprising:

an arc tube; and a sealing portion in which a front end of an exhaust pipe capable of exhausting gas in the arc tube or supplying gas into the arc tube is sealed, wherein, in the sealing portion, a height of a first sealed space, which has a tapered shape that becomes narrower toward a front end of the sealing portion, is larger than twice an inner diameter of the first sealed space.

2. The super-high pressure lamp according to claim 1, wherein a front end of the first sealed space is not branched.

3. The super-high pressure lamp according to claim 1 further comprising a first branch and a second branch formed by branching a front end of the first sealed space, wherein an interval between a front end of the first branch and a front end of the second branch is 1.5 mm or less.

4. The super-high pressure lamp according to claim 3, wherein the interval between the front end of the first branch and the front end of the second branch is shorter than an interval between a root of the first branch and a root of the second branch.

5. The super-high pressure lamp according to claim 4, wherein the first branch and the second branch are twisted in a pair.

6. The super-high pressure lamp according to claim 1, wherein an outer diameter of the sealing portion is three times or more the inner diameter.

7. The super-high pressure lamp according to claim 1 further comprising two side tubes connected to the arc tube and disposed opposite to each other with the arc tube interposed between the two side tubes, wherein the sealing portion is provided on a curved surface of any one of the two side tubes.

8. The super-high pressure lamp according to claim 1 further comprising two side tubes connected to the arc tube and disposed opposite to each other with the arc tube interposed between the two side tubes, wherein the sealing portion is provided inside any one of the two side tubes.

9. The super-high pressure lamp according to claim 1 further comprising two side tubes connected to the arc tube and disposed opposite to each other with the arc tube interposed between the two side tubes, wherein an electrode is disposed inside each of the two side tubes, and the sealing portion is provided on the arc tube.

10. The super-high pressure lamp according to claim 1 further comprising two side tubes connected to the arc tube and disposed opposite to each other with the arc tube interposed between the two side tubes, wherein an electrode is disposed inside each of the two side tubes, and the sealing portion is provided on a curved surface of any one of the two side tubes.

11. The super-high pressure lamp according to claim 1, wherein the super-high pressure lamp is a laser sustained plasma lamp.

* * * * *